1

3,502,277
COMMINUTING MACHINE WITH ADJUSTABLE
ROTARY MEMBER
Hans Baier, Garmisch-Partenkirchen, Rolf Mayer, Giengen, Helmut Braun, Herbrechtingen, Harry Preiss, Giengen, and Walter Ilg, Ulm, Germany, assignors to Robert Bosch Hausgeraete G.m.b.H., Giengen, Germany
Filed Apr. 11, 1968, Ser. No. 720,514
Int. Cl. B02c 7/08, 7/14
U.S. Cl. 241—259          12 Claims

ABSTRACT OF THE DISCLOSURE

A comminuting machine includes the housing and a comminuting unit arranged in the housing. The comminuting unit includes a substantially conical first member and a rotatable annular second member surrounding the first member so that a gap exists between their juxtaposed surfaces. The second member is movable axially of the conical member so that the gap can be increased and decreased depending on whether material to be comminuted is to be comminuted coarsely or finely.

BACKGROUND OF THE INVENTION

The present invention relates to comminuting machines in general, and more particularly to a comminuting machine for coffee beans, a so-called "coffee grinder."

Coffee grinders are of course well known in recent years a variety of such devices, operated electrically, has become known and available commercially. Generally speaking, all of these known devices are satisfactory in that they perform the intended function, namely grinding of coffee. However, various problems persist without satisfactory solution, such as difficulties with precise adjustment of the machine for various degrees of coarseness or fineness of the comminuted coffee, disassembly of the various components for cleaning, and other problems known to those skilled in the art.

It is therefore a general object of the present invention to provide a comminuting machine of the type here in question which is not subject to these disadvantages.

SUMMARY OF THE INVENTION

In accordance with one feature of our invention we provide, in a comminuting machine of the type in question particularly in a coffee grinder, the combination of housing means with a comminuting unit which is arranged in the housing means. The comminuting unit includes a substantially conical first member which is immovable mounted and which has an outer circumferential first comminuting surface. An annular second member surrounds with clearance the first member and has an inner circumferential second comminuting surface which faces the first surface and which defines an annular gap therewith. Means is provided which mounts the second member rotatably with reference to the first member, and further mounts the second member with freedom of axial movement relative to the first member to thereby enable increasing and decreasing of the gap between the two juxtaposed circumferential surfaces for enabling selection of the degree of comminution, that is the coarseness of fineness, of the coffee beans.

By resorting to our invention the components of the comminuting unit may be mounted in a simple manner without requiring the use of additional supporting members, and further the adjustment of the gap between the juxtaposed circumferential surfaces is simple and can be accomplished with precision. The ground coffee will pass freely through the comminuting unit without requiring the use of a separate removing device as it is necessary in some of the prior-art constructions. The device is simple to operate and adjustments can be carried out quickly, easily and without the exertion of significant physical force. The construction is such that the formation of "pockets" within the housing is avoided in which quantities of ground coffee could be accumulated, unbeknownst to the user, which would over a period of time adversely affect the aroma of the coffee which is being newly ground.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
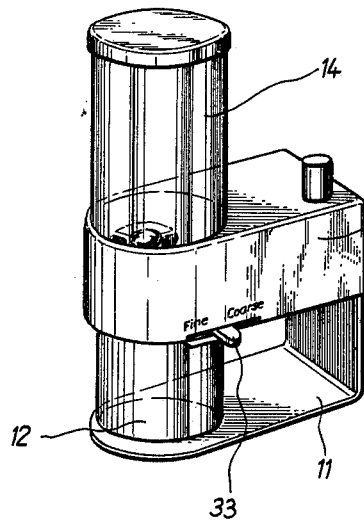
FIG. 1 is a perspective view of a machine embodying our invention.

Discussing now the drawing in detail and firstly FIG. 1 thereof, it will be seen that the comminuting machine shown therein is generally identified with reference numeral 10 and is supported on the support or base 11 which may be placed onto a supporting surface, such as a table top. As is clearly visible in FIG. 1, the underside or lower side of the machine 10 is readily and completely accessible when it is supported on the base 11. A receptacle for comminuted material, which hereafter will be assumed to be coffee, is identified with reference numeral 12 and is placed under the comminuting machine 10 where it is held in suitable well known manner by a holding arrangement 13 (compare FIG. 3) which need not be further described. Carried atop the comminuting machine 10 is a hopper-type receptacle 14 into which the coffee beans to be comminuted are introduced and in which they may be stored if desired. The receptacles 12 and 14 are advantageously made of a transparent material, for instance synthetic plastic material, as indicated in FIG. 1.

Figure 2:
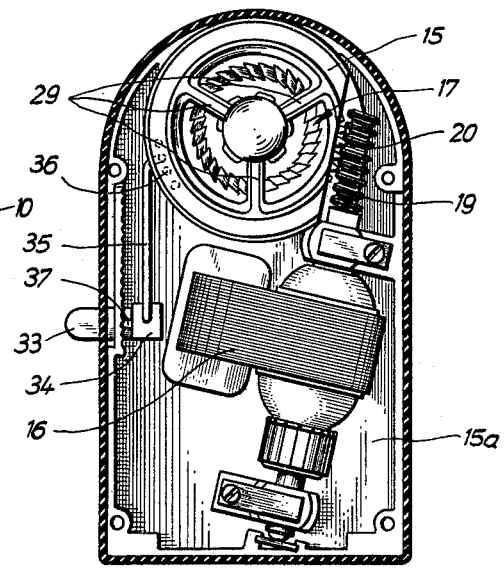
FIG. 2 is a section taken on the line II—II of FIG. 3.
Figure 3:
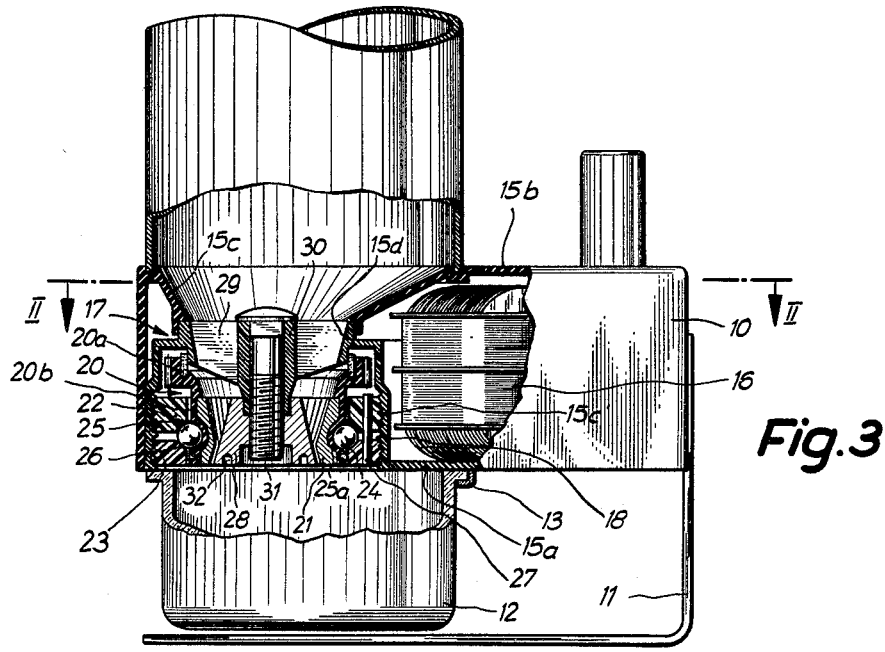
FIG. 3 is a vertical longitudinal section through the apparatus shown in FIG. 2.

FIGS. 2 and 3 illustrate that the housing of the comminuting machine 10 includes a bottom portion 15a and a top or cover portion 15b. Mounted in the illustrated embodiment on the bottom portion 15a is an electromotor 16 and a comminuting unit 17 which is driven by the motor 16. The cover portion 15b is provided with an aperture located above the comminuting unit 17 (compare FIG. 3) through which aperture coffee beans may enter into the comminuting unit from the receptacle 14. A further housing portion 15c tapers in substantially funnel-shaped configuration from this aperture downwardly and terminates with its bottom edge in the immediate vicinity of the upper edge of a substantially cylindrical housing portion 15c' which extends upwardly of the bottom portion 15a. Located within the hollow cylindrical housing portion 15c' is the comminuting unit 17 as is clearly visible in FIG. 3. The upper part of the housing portion 15c' is provided with a section 15d which tapers in funnel-shaped configuration downwardly away from the housing portion 15c so that coffee beans entering through the opening in the top or upper portion 15b will slide into the section 15d and be conveyed thereby to the comminuting unit. FIG. 3 shows that the bottom portion 15a is also provided with an opening whose inner diameter in this instance corresponds to the inner diameter of the hollow cylindrical housing portion 15c'. The inner surface of the housing portion 15c' is provided with an internal screw thread extending upwardly from this opening in the bottom portion 15a to a level located substantially midway between the upper and lower ends of the housing portion 15c'.

FIGS. 2 and 3 both show that the prime mover, that is here the electromotor 16, is arranged on the bottom portion 15a laterally of the hollow cylindrical housing portion 15c'. The drive shaft of the motor 16 is provided with a run gear 19 which co-operates with a worm wheel 20 of the comminuting unit 17, and the drawing shows that the worm wheel 20 rotates in a substantially horizontal plane. We have found it advantageous to produce the worm wheel 20 from synthetic plastic material, for instance by injection molding, and FIG. 3 shows that the wheel 20 is provided with an upper section 20a on which the gear teeth are formed and with a lower section 20b which is of substantially cylindrical configuration and extends in downward direction in FIG. 3. Located interiorly of the lower section 20b, that is within the confines of the same and connected thereto, is an annular comminuting member 21 having an inner circumferential surface. The worm wheel and the member 21 are rotatable in a mounting ring which, as FIG. 3 shows, consists of two individual ring members provided with outer screw threads which mesh with the inner screw threads 18 of the housing portion 15c'. They thus can be individually threaded into the interior of the housing portion 15c' so as to be located therein coaxially but axially spaced from one another. These individual ring portions are identified with reference numeral 22 and 23 and are each provided with bevelled edge portions 25 and 26 at their facing axial sides. The portion 20b is provided in its outer circumferential surface with a groove 25a and a plurality of rolling elements, here shown as balls 24, are located in the raceway defined between the groove 25 and the bevelled edge portions 25, 26.

It is of course necessary that the ring portions 22 and 23 not be rotatable with reference to one another and they are therefore connected against such relative rotation by a pin 27 extending into both of them so that they can be rotated only jointly.

The member of the comminuting unit which co-operates with the annular comminuting member 21 is a substantially conical comminuting member 28. This is, as FIG. 3 shows, located within the confines of the annular member 21 so that its outer circumferential comminuting surface is juxtaposed with the inner circumferential comminuting surface of the annular member 21. The conical member 28 is secured in its non-rotatable and non-adjustable position in the manner shown in FIG. 3. The portion 15d of the housing is provided with three ribs 29 (compare FIG. 2) which extend substantially radially and carry at their juncture a vertical sleeve or sleeve portion 30. A threaded bolt or similar member 31 is placed through this sleeve 30 from the top of the device and the conical member 28 is threaded onto this bolt 31 from the bottom of the device. To be quickly releasable and securable on the bolt the member 28 is provided in its bottom surface with two or more recesses 32 into which a suitable tool or portions of such tool can be inserted to thereby enable rotation of the member 28 with reference to the bolt 31 when it is to be threaded onto or removed from the bolt 31. As FIG. 3 shows, the bottom faces, that is the lower axial end faces of the members 31, 28 and the mounting ring 21 are flush with the bottom wall portion 15a of the housing.

To effect changes in the degree of comminution of the coffee beans, that is to change to a coarser or finer grind, the annular comminuting member 21 is axially shifted with reference to the conical member 28. This is accomplished in simple manner via a linkage arrangement controlled by an engaging portion 33 which is accessible at the exterior of the housing of the comminuting machine 10. FIG. 1 shows that suitable indicia may be provided on the housing to indicate in which direction the engaging portion 33 is to be moved, it being clear that such moving is to be a sliding movement towards the left or towards the right in FIG. 1. FIG. 2 indicates that a mounting member 34 is secured to the engaging portion 33 and that a linkage bar 35 is secured at one end to the mounting member 34 and extends with its other end into a recess 36 provided on the mounting ring 22, 23. The connection thus established is of the articulate type, that is the end portion of the member 35 received in the recess 36 is turnable freely therewithin. If, now, the engaging portion 33 is moved to its one or the other side in the slot in the housing through which it extends to the exterior thereof (compare FIG. 1) then the mounting ring 22, 23 will be subjected to tangentially acting forces which will effect turning of the mounting ring in the screw thread 18 so that the mounting ring and thereby the annular comminuting member 21 will shift axially with respect to the comminuting member 28. The gap between the inner and the outer circumferential surfaces of the members 21 and 28 is thus increased or decreased with a resultant change in the comminuted product towards a coarser or finer texture. Once the desired setting is achieved, a detent arrangement, such as a well known spring-type detent 37, prevents accidental and undesired changing of the setting. As FIG. 2 shows, several of the recesses 36 may be provided at circumferentially spaced locations in the mounting ring 23, 22 to permit a rough initial adjustment of the setting of the ring 21 with reference to the member 28. Thus, the end portion of the member 35 can be introduced into whichever of the recesses 36 is deemed most suitable and the setting thus obtained is the base setting which may be adjusted towards coarser or finer grinding with the help of the engaging portion 33 in the manner discussed above.

It will be understood that each of the elements described above, or two or more together, may also find a useful application in other types of constructions differing from the types described above.

While the invention has been illustrated and described as embodied in a coffee grinder, it is not intended to be limited to the details shown, since various modifications and structural changes may be made without departing in any way from the spirit of the persent invention.

With further analysis, the foregoing will so fully reveal the gist of the present invention that others can by applying current knowledge readily adapte it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a comminuting machine, particularly a coffee grinder, a combination comprising housing means; and a comminuting unit arranged within said housing means and including a substantially conical first member having an outer circumferential first comminuting surface, and an annular second member surrounding said first member with clearance and having an inner circumferential second comminuting surface facing said first surface and defining an annular gap therewith; and means mounting said second member rotatably as well as with freedom of axial movement with reference to said first member whereby to enable increasing and decreasing of said gap to thereby determine whether material is to be coarsely or finely comminuted.

2. In a comminuting apparatus as defined in claim 1, wherein said means comprises a mounting ring, said second annular member being secured to said mounting ring within the confines thereof coaxially therewith and rotatable relative thereto and said mounting ring being shiftable axially with reference to said first member.

3. In a comminuting apparatus as defined in claim 2; further comprising drive means including a prime mover, a worm gear driven by said prime mover, and a worm wheel meshing with said worm gear; and wherein said second annular member is coaxial with said worm wheel secured non-rotatably to the same, and said worm wheel comprises a portion located within the confines of said mounting ring rotatable and axially shiftable with reference to the same.

4. In a comminuting apparatus as defined in claim 3, wherein at least said worm wheel consists of synthetic plastic material.

5. In a comminuting apparatus as defined in claim 3, wherein said worm wheel has an outer peripheral surface provided with a groove and said mounting ring has an inner peripheral surface provided with a complementary groove; and a plurality of rolling elements received in said grooves between said peripheral surfaces so that said worm wheel may rotate with reference to said mounting ring.

6. In a comminuting apparatus as defined in claim 5, wherein said mounting ring consists of two coaxial annular sections located axially adjacent one another, and connecting means connecting said sections against rotation relative to each other.

7. In a comminuting apparatus as defined in claim 5; further comprising a bolt mounted on said housing above said second member and extending coaxially through the latter, and wherein said first member is adapted to be threaded onto said bolt from below said second member.

8. In a comminuting apparatus as defined in claim 1, said housing having a bottom wall and said first and second members each having a lower axial endface facing said bottom wall and located closely adjacent thereto.

9. In a comminuting apparatus as defined in claim 8, wherein said mounting ring is externally screw-threaded and wherein said housing is provided with an internal screw thread extending in upward direction from said bottom wall coaxially with said first member, the screw threads on said mounting ring meshing with the screw thread in said housing.

10. In a comminuting apparatus as defined in claim 9; and further comprising actuating means operatively associated with said mounting ring and accessible externally of said housing for enabling an operator to effect axial shifting of said mounting ring and thereby of said second member.

11. In a comminuting apparatus as defined in claim 10, said actuating means including a linkage articulately connected to said mounting ring and said housing and operative for transmitting to the latter tangentially directed forces so as to effect turning of said mounting ring and consequent axial shifting of the same.

12. In a comminuting apparatus as defined in claim 11, said mounting ring and linkage means being constructed so that the latter may be connected to the former at a plurality of circumferentially spaced locations thereof.

References Cited

UNITED STATES PATENTS

| 368,710 | 8/1887 | Fredericks | 241—259 X |
| 2,412,677 | 12/1946 | Eppenbach et al. | 241—259 |
| 2,563,768 | 8/1951 | Wood | 241—259 X |
| 2,763,440 | 9/1956 | Johnson | 241—259 X |

FRANK T. YOST, Primary Examiner